Nov. 25, 1958 P. R. MARZAN ET AL 2,862,051

METHOD AND APPARATUS FOR FACSIMILE TELEGNOSIS

Filed March 5, 1952

INVENTORS.
PETER R. MARZAN
WILLIAM HOWARD HILL
BY John J. Rogan
ATTORNEY.

United States Patent Office 2,862,051 Patented Nov. 25, 1958

2,862,051

METHOD AND APPARATUS FOR FACSIMILE TELEGNOSIS

Peter R. Marzan, New York, and William H. Hill, West Brighton, N. Y., assignors to Times Facsimile Corporation, New York, N. Y., a corporation of New York Application March 5, 1952, Serial No. 274,948

15 Claims. (Cl. 178—6.7)

Figure 1:
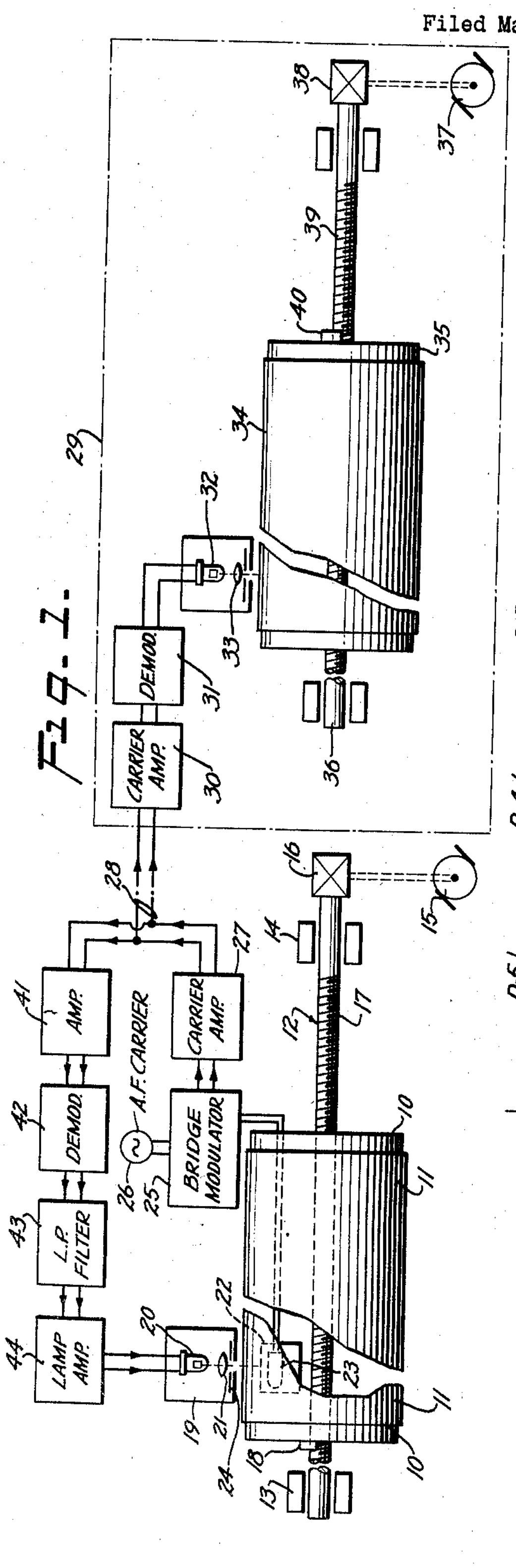

This invention relates to telefacsimile systems, and more especially it relates to a system peculiarly well adapted to transmit X-ray and similar pictures having an extremely wide range of light and shade characteristics.

Heretofore it has been proposed to use conventional telefacsimile apparatus to transmit and receive X-ray pictures. Such arrangements are highly desirable since the services of an expert radiologist can thereby be obtained at any one of a number of remote points. Without such facsimile equipment the radiologist is required to travel from one hospital to another on a regular schedule, or it is necessary to mail the X-ray films from the remote point to a radiologist for interpretation. Mail service is often too slow to be practical, especially in emergency situations. Neither of these customary methods provides a quick interpretation of an X-ray picture in situations where one may be required. For such reasons it has been proposed to give rural hospitals or medical offices the expert diagnostical advantages of large metropolitan institutions, by installing a facsimile transmitter at each remote point, and transmitting the X-ray pictures by facsimile technique to the large center. For example it requires only five minues to transmit a complete 14 by 17 inch X-ray picture. This process of transmitting and interpreting X-ray pictures is called "Telegnosis."

For practical and economic reasons such telegnosis is effected over standard commercial telephone circuits, which however introduce severe restrictions on the utility and even reliability of the telegnosis. For example X-ray films or negatives cover an extremely wide density range of about 0.13 to 2.7, as compared with 0.1 to 1.4 for positive print photos as commercially transmitted by conventional telefacsimile equipment. This wide density range introduces the problem of generating at the facsimile transmitter a facsimile signal which faithfully represents all the density conditions, both in the very light density regions and in the very dark regions. In the conventional facsimile transmitter using a phototube or photoelectric cell, the scanning light is projected through the negative film and impinges upon the phototube which correspondingly varies its internal resistance and this resistance is used to modulate an audio frequency carrier. Thus when the light transmitted through the film is zero, the resistance of the phototube is about 500 thousand megohms. When the light transmitted through the film is strong, for example in a completely transparent area, the phototube resistance is in the order of a few hundred megohms.

In one known kind of modulator of the balanced bridge category, this change of prototube resistance is used to control the bridge unbalance and thus to vary the amplitude of the audio frequency carrier. The signal from such a modulator varies over an amplitude range of about 1000 to 1, or 60 decibels, when scanning from maximum film density to minimum film density. A signal of such a wide decibel range cannot be satisfactorily transmitted over a conventional commercial wire or radio circuit, because the minimum signal level expressed in decibels may be considerably below the noise level of the transmission circuit. If a special transmission circuit were designed to operate at the required low noise level, there would still exist the limitations introduced by the limited operating range of the conventional facsimile recorder, especially where such a recorder uses a recording lamp of the gaseous glow or crater kind. Such lamps have a working signal range of only 15 to 1, and therefore much of the received signal would be flattened out in the reproduced copy.

At first glance it might appear that a solution for this dilemma would be to have the facsimile transmitter generate a signal whose range from maximum to minimum is considerably less than that which would be generated by the conventional phototube-controlled bridge modulator. It is possible of course to modify the conventional bridge modulator by unbalancing it so that the signal representing maximum film density is about one-tenth of the signal representing minimum film density. Recorded facsimile copy obtained thereby would exhibit good detail in the lighter portions of the X-ray picture, but no adequate detail would be exhibited in the very dark or dense portions. Thus the facsimile signal representing a 2 to 1 increase in a transmission for a high density area, would increase less than 10%, while a signal representing a 2 to 1 increase in transmission for a low density area, would increase almost 100%. The conventional facsimile recorder is designed so that the light output from the recording lamp is inversely proportional to the received signal voltage. Therefore, in the received facsimile negative, the 2 to 1 change in transmission for the light density portions, would show up even more than on the original X-ray negative at the transmitter, and the dark portions of that original negative would not show up at all.

While as a suggested solution it has been proposed to compress the high level signal at the facsimile transmitter, such compression results in a reduction of the contrast range between high density and low density areas in the recorded copy, and furthermore it is necessary to manually re-balance the modulator bridge at the transmitter when the original X-ray negative has completely opaque areas. Furthermore, only a relatively limited amount of compression may be used, as the detail in the low density areas of the negative would otherwise be lost.

While for certain classes of X-ray films, this compression method may be satisfactory, it is not satisfactory for films having a great amount of detail in the high density areas. Its reliability in telegnosis is therefore limited to those films wherein the density is not above a certain magnitude, unless the transmitting operator examines each film for its heavy density qualities and thereupon manually adjusts the intensity of the scanning lamp at the facsimile transmitter for that portion of the original film which he thinks is most important; or it may even be necessary to transmit a series of films in order to show on individual received negatives, different density portions corresponding to those of the original negative. This, of course, requires the services of a technician at each remote transmitter and who must have a knowledge of what a radiologist is seeking in the X-ray film. This would therefore, defeat the very purpose of eliminating such a radiologist at the individual remote points.

Accordingly, it is a principal object of this invention to provide a method and apparatus for transmitting and recording X-ray pictures, which overcome the above-noted and other disadvantages.

Another object is to provide an improved facsimile transmission system wherein the scanning light source at the facsimile transmitter has its intensity automatically correlated with the density range of an X-ray film being transmitted, so as to insure the proper amount of detail in the recorded picture both in the very light and in the very dark areas thereof.

A features of the invention relates to a facsimile transmitter especially suited to the transmission of X-ray and similar pictures of extremely wide shade density range, and employing a scanning lamp of the gaseous glow kind which has its intensity automatically adjusted to maintain substantial linearity of facsimile output signal over the entire range of shade densities to be transmitted.

Another feature relates to an improved facsimile transmitter especially suited for X-ray picture transmission, employing the combination of a gaseous glow lamp for scanning, a bridge modulator controlled by said lamp, and a special feedback circuit for automatically correlating the intensity of the lamp with the maximum range of shade densities in the subject matter being transmitted, so as to insure substantial linearity of facsimile signal output regardless of the shade density range in the particular X-ray picture being transmitted.

Another feature relates to a method of transmitting X-ray pictures by telefacsimile technique, whereby the cost of radiological examination can be decreased, and a plurality of remote points can be provided with expert radiological service from a central point while using ordinary commercial wire or radio channels which have a limited range of transmission expressed in decibels above a minimum noise level.

A still further feature relates to the novel organization, arrangement and relative location and interconnection of parts which cooperate to provide an improved telegnosis system.

Other features and advantages not specially enumerated will be apparent after a consideration of the following detailed descriptions and the appended claims.

In the drawing which shows by way of example one preferred manner of practising the invention, Fig. 1 is a composite schematic block diagram and wiring arrangement of a telefacsimile system embodying the inventive concept.

Figure 2:
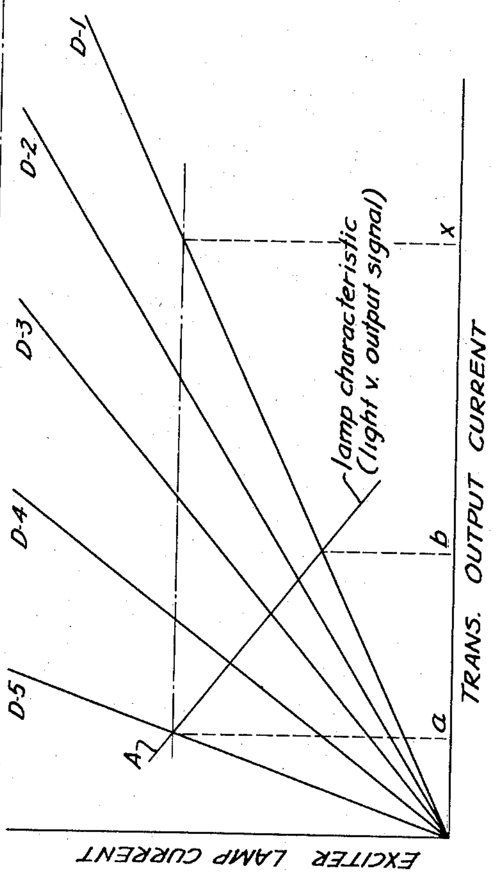

Fig. 2 is a series of graphs used in explaining the invention.

Referring to Fig. 1, there is shown in generalized schematic form a facsimile transmitter comprising for example the cylindrical scanning drum 10 of glass or other transparent material, around which is wrapped and held in any suitable manner, the X-ray negative 11 to be interpreted. Drum 10 can be keyed or splined to a shaft 12 supported for rotation in suitable bearings 13, 14, and rotated at a fixed and accurately controlled speed by a suitable motor 15 through a suitable geartrain 16. Shaft 12 may have a lead-screw portion 17 which is engaged by a releasable threaded half-nut or follower 18 carried by drum 10. Thus the rotation of shaft 12 results in corresponding rotation of drum 10, and in its indexing movement parallel to shaft 12.

Suitably mounted adjacent drum 10 is a housing 19, enclosing the scanning lamp 20, and the optical system 21 for projecting the light from lamp 20 in the form of a spot through a suitable opening in housing and thence on to the surface of the film 11. Another light-tight housing 22 encloses the phototube or photoelectric cell 23 and is suitably supported within the drum 10. In order to restrict the illumination of cell 23 to successive elemental areas of the film 11, a suitable apertured baffle 24 is mounted in front of the phototube. In accordance with one feature of the invention, the lamp 20 is of the gaseous glow or crater type, which has a linear relation between lamp excitation current and light output, as represented by the graph A (Fig. 2) As is well-known, this type of lamp has the property of having the intensity of its gaseous glow substantially instantaneously modulatable in accordance with the value of the excitation current applied thereto.

The light from lamp 20 therefore illuminates each successive element area of film 11, and the intensity of the light which excites the phototube 23 is determnied by the shade density of the corresponding elemental area of film which is at any particular instant being scanned. It has been found that it is not at all uncommon to have X-ray films which have a density range of 0.13 to 2.7, whereas ordinary commercial positive prints transmitted by commercial telefacsimile machines show a density range of only 0.1 to 1.4. The phototube 23 correspondingly varies in resistance and is connected to one arm of a balanced bridge network 25 of the generic Wheatstone type, such for example as disclosed in U. S. Letters Patent No. 2,298,466. This bridge is supplied with an audio-frequency carrier from a suitable audio-frequency generator 26. Thus the output of bridge modulator 25 is a facsimile signal in the form of an amplitude-modulated audio-frequency carrier, for example of 1800 cycles per second carrier frequency. This facsimile signal is then amplified in a suitable carrier amplifier 27, and the amplified carrier is transmitted over a commercial telephone line 28 to a central receiving point 29 which may be located, for example, in the radiological X-ray examination room of a hospital or the like. At the central point, the received carrier is amplified in a suitable amplifier 30 and the facsimile signal modulations are demodulated or detected in the demodulator 31. These signals are then impressed upon a recording lamp 32 of the crater gaseous glow type similar to lamp 20, and the modulated light spot is focused by a suitable optical system 33 and apertured light baffle upon a photographic film 34 which is wrapper around the drum 35. Drum 35 is splined to shaft 36 which is rotated by motor 37 through gear train 38. The shaft 36 has a threaded portion 39 which engages the half-nut 40 on drum 35. By any means well-known in the art, the motor 37 is synchronized with motor 15 so that the point-by-point scanning of film 34 is synchronous with the point-by-point scanning of film 11.

In accordance with the invention, the carrier output from amplifier 27 is further amplified in amplifier 41 and the amplified voltage is passed through a demodulator 42 to detect the facsimile signal modulations. These signals are then passed through a low-pass shunt filter 43. The filtered voltages are then amplified in the amplifier 44 whose output is impressed across the two electrodes of crater lamp 20. Filter 43 is designed so that substantially all the signal modulations in the carrier up to for example 1000 cycles per second, are passed to the amplifier while frequencies in the neighborhood of the carrier, for example 1800 cycles per second are shunted away from the amplifier. Therefore, with this arrangement the intensity of the scanning light spot on film 11 is varied inversely as the transparency of each succeeding scanned spot of the film 11 varies as shown in Fig. 2. Thus for high transparency the light intensity is decreased, while for low transparency the light intensity is increased. For this reason it is necessary to use a crater lamp to illuminate the film 11 since the filament type of lamp usually used for that purpose is too sluggish. Furthermore, only a single phototube 23 is required to generate the facsimile signals for transmission to the distant station, and to provide the automatically controlled excitation voltage for the lamp. Thus on high level output from the facsimile transmitter corresponding to a film area of very low density, that is, high transparency the lamp intensity is relatively low; while on low level output corresponding to a film area of very high density, that is, low transparency the lamp intensity is relatively high. This arrangement will compress a wide variation in signal amplitude to a variation of 10 to 1, or 20 decibels. This compression is such that the entire density range of film 11 is not limited so far as transmission is concerned, and a small variation in any region of the film 11 will show up as a corresponding variation in the transmitted signal. In actual operation with the density of the X-ray film varying from 0.13 to 2.7, the current passing through the crater lamp can be set to swing from 3 to 40 milliamperes.

The crater lamp 20 is such that its light output varies substantially in direct proportion to the current passing through the lamp as indicated by graph A (Fig. 2). Thus the intensity of the scanning spot on film 11 can vary over a range of more than 13 to 1 when the X-ray film being scanned has a very wide density range. The output range of 10 to 1 decibels from the facsimile transmitter is easily accommodated by the conventional telephone line 28 and is about the right range to use for the recording lamp 32.

Referring to Fig. 2, the graphs designated D–1 to D–5 illustrate the normal output current variations that would be obtained with film densities respectively of D–1 to D–5, the output current from the transmitter being plotted as abscissae, and the lamp current being plotted as ordinates. The range *a—b* is correlated with the passband of the filter 43 which has a time constant as low as possible for circuit stability and in that region the relation between output current and lamp intensity is linear. If the lamp 20 were maintained at a fixed intensity, then the points of intersection of the lamp graph A, with the film density graphs D1–D5 would produce an excessively wide range in output current, for example *a—x*, and the relative values for the various densities would sharply increase from the dense to the light regions. By varying the lamp intensity automatically and as indicated by graph A, the points of intersection between the lamp graph and the density graphs are all compressed within the range *a—b*, thus enabling all film densities to be transmitted within that range.

It will be understood that while one particular manner of executing the scanning movement of the light spots with respect to the films has been disclosed, that any other well-known scanning means may be employed. Therefore, various changes and modifications can be made in the disclosed embodiments without departing from the spirit and scope of the invention.

What is claimed is:

1. In a facsimile transmitter, a scanning light source, means to scan a subject matter by said source in a point-by-point manner, a single light sensitive cell responsive to said point-by-point scanning, a source of voice frequency carrier waves, means to modulate said carrier waves by the output of said cell to produce a modulated voice frequency carrier for transmission over a telephone line having a relatively restricted useful decibel transmission range, means to derive from said modulated carrier prior to transmission over said line a light source control voltage, and means to apply said control voltage to said light source to decrease the light intensity as the transparency of the scanned points increases and thereby to compress the range of output signal amplitude from said cell to correspond with the useful decibel transmission range of said line.

2. In a facsimile transmitter for transmitting X-ray pictures and the like over a transmission channel of limited useful decibel range, the combination of means to generate a scanning light spot, means to illuminate an elemental area on said picture by said light spot, means to produce relative scanning motion in co-ordinate directions between said spot and the picture to scan the latter in successive elemental areas, a light-sensitive cell responsive to said scanning to produce corresponding electric facsimile signal output to be transmitted, and means including said cell and a portion of said signal ouput to vary the intensity of said spot under control of said signals and in inverse relation to the transparency of the elemental areas at the instants they are being scanned, whereby a predetermined compression is produced in said signal output prior to being applied to said transmission channel.

3. In a facsimile transmitter for transmitting X-ray pictures and the like, the combination of means in the form of a gaseous glow lamp to generate a scanning light spot, means to project said spot on the picture, means to produce relative scanning motion in co-ordinate directions between said spot and picture to scan the latter in successive elemental areas, a light-sensitive cell responsive to said scanning to produce corresponding electric facsimile signal output, means to apply said signal output in the form of a modulated carrier to a transmission channel having a restricted decibel transmission range, and means including said cell and a portion of said modulated carrier to vary intensity of said spot at each scanning instant and under control of said modulated carrier and in inverse relation to the transparency of the elemental areas as they are being scanned to compress the carrier power output to match said transmission range.

4. In a facsimile transmitter for transmitting X-ray pictures and the like over a transmission channel having a limited decibel accommodation range, the combination of a gaseous glow lamp having a substantially linear relation between current input and light ouput, means to scan successive elemental areas of a picture by said lamp to produce corresponding electric facsimile signals, a source of carrier frequency, means to modulate said source by said signals, and means to limit the carrier power output to correlate it with the decibel accommodation range of said channel, the last-mentioned means including an amplifier for supplying excitation current to said lamp, a demodulator for said carrier to derive lamp control voltages corresponding to said modulations, and means to impress the said control voltages on the input of said implifier, said amplifier having its output connected to the electrodes of said lamp for varying its excitation and thereby to correlate the carrier output with the decibel accommodation range of said channel.

5. A facsimile transmission system according to claim 4, in which means are connected between said demodulator and said amplifier to filter out demodulated frequencies close to the said carrier frequency.

6. A facsimile transmitter according to claim 4, in which a low-pass filter is connected between said demodulator and said amplifier for passing substantially only the demodulated signal modulations.

7. In a facsimile transmitter for transmitting X-ray negatives and the like, the combination of a gaseous glow lamp of the crater type, means to scan successive elemental areas of an X-ray picture by light from said lamp to produce corresponding facsimile signals, a balancing bridge network, a source of carrier waves, means connecting said source and said signals to said bridge circuit to produce a corresponding modulated carrier, means to transmit said modulated carrier to a facsimile receiver and including a transmission channel which is designed to accommodate only a limited decibel range, means to apply a portion of said modulated carrier to a demodulator to produce demodulation voltages corresponding to said signals, means to amplify said demodulated voltages and to apply them to the electrodes of said lamp to vary the intensity thereof in inverse relation ot the densities of the said elemental areas as they are being scanned.

8. A facsimile transmitter according to claim 7 in which a low-pass filter is connected between said demodulator and said amplifier to filter out all demodulated frequencies in the neighborhood of the carrier frequency.

9. Apparatus for reproduction of a picture which has a high degree of contrast, for example an X-ray film and the like, comprising in combination, means to illuminate the picture to be reproduced by a scanning light spot, means to produce relative scanning motion in co-ordinate directions between said light spot and said picture to scan the latter in successive elemental areas, an electric output circuit wherein output signal voltages are produced under control of said scanning, means including said scanning spot illuminating means and a photo-sensitive transducer for producing said voltages in said output circuit which voltages vary with the change in shading of said successive elemental areas being scanned and means to vary the intensity of said scanning spot automatically and concurrently with the degree of shade of the area being scanned, to reduce the range of the said output signal voltages while maintaining a substantially linear relation between incremental changes in shade density and incremental changes in said output signal voltages.

10. Apparatus according to claim 9 in which means are provided for exposing a sensitized picture reproducing surface in successive elemental areas under control of said intensity varied light spot.

11. Apparatus according to claim 9 in which said illuminating means comprises an electric lamp and a power source for supplying excitation current to said lamp, said transducer includes a photo-electric tube, and circuit connections are provided between said tube and said lamp to vary the excitation current of the lamp to maintain said linear relation.

12. Apparatus according to claim 11 in which said electric lamp is of the gaseous glow discharge kind.

13. Apparatus according to claim 11 in which said electric lamp is of the kind which generates a spot glow discharge, and the means for producing said relative scanning motion includes a rotatable drum on which is mounted the picture to be reproduced.

14. Apparatus for reproduction of a picture which has a high degree of contrast, for example an X-ray film and the like, comprising in combination, a gaseous glow discharge lamp for producing a spot glow discharge, a current supply circuit for said lamp, means to cause the glow from said lamp to scan the picture in successive elemental areas, a photo-electric tube responsive to the illumination of successive elemental areas of the picture being scanned by said spot glow, and an electric circuit interconnected between said tube and said lamp supply to vary the excitation current of said lamp automatically and concurrently with the degree of shade of the area being scanned and in substantially linear relation over the contrast range of the picture being scanned.

15. The method of scanning a picture having a high degree of contrast, such for example as an X-ray film and the like, which comprises generating a luminous scanning spot, scanning the picture in successive elemental areas by said spot to produce a lamp control voltage, applying said voltage to vary the intensity of said spot automatically and concurrently with the degree of shade difference between the successive scanned elemental areas being scanned to maintain a substantially linear relation between incremental changes in shade density and incremental changes in the said control voltage while compressing the range of variation of said voltage compared with the contrast range of the picture being scanned.

References Cited in the file of this patent

UNITED STATES PATENTS

| | | |
|---|---|---|
| 1,820,335 | Von Bronk et al. | Aug. 25, 1931 |
| 2,084,700 | Ogloblinsky | June 22, 1937 |
| 2,158,193 | Morse | May 16, 1939 |
| 2,188,679 | Dovaston | Jan. 30, 1940 |
| 2,204,061 | Andrien | June 11, 1940 |
| 2,238,762 | Whitaker | Apr. 15, 1941 |
| 2,480,423 | Simmon | Aug. 30, 1949 |
| 2,480,425 | Simmon | Aug. 30, 1949 |
| 2,509,987 | Newman | May 30, 1950 |
| 2,570,665 | Gunderson | Oct. 9, 1951 |